United States Patent
York

(10) Patent No.: US 7,559,834 B1
(45) Date of Patent: *Jul. 14, 2009

(54) DYNAMIC JOIN/EXIT OF PLAYERS DURING PLAY OF CONSOLE-BASED VIDEO GAME

(75) Inventor: James R. J. York, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 612 days.

This patent is subject to a terminal disclaimer.

(21) Appl. No.: 10/307,628

(22) Filed: Dec. 2, 2002

(51) Int. Cl.
- A63F 9/02 (2006.01)
- A63F 13/10 (2006.01)
- A63F 13/02 (2006.01)
- A63F 13/06 (2006.01)
- A63F 13/12 (2006.01)

(52) U.S. Cl. ............... 463/2; 463/29; 463/31; 463/37; 463/40

(58) Field of Classification Search ......... 463/1, 463/2, 5, 7, 25, 29–32, 36–39, 40–42, 49–57; 434/11–24; 348/211.7, 564–568, 588, 589; 700/83, 34, 85

See application file for complete search history.

(56) References Cited

U.S. PATENT DOCUMENTS

| | | | |
|---|---|---|---|
| 4,091,234 A | | 5/1978 | Bristow |
| 4,124,787 A | | 11/1978 | Aamoth et al. |
| 4,275,611 A | | 6/1981 | Asher |
| 4,349,708 A | | 9/1982 | Asher |
| 4,687,200 A | | 8/1987 | Shirai |
| 4,738,451 A | * | 4/1988 | Logg ............... 463/2 |
| 5,411,270 A | * | 5/1995 | Naka et al. ............ 463/33 |
| RE35,314 E | * | 8/1996 | Logg ............... 463/2 |
| 5,618,045 A | * | 4/1997 | Kagan et al. ............ 463/40 |
| 5,724,558 A | * | 3/1998 | Svancarek et al. ............ 703/21 |
| 5,807,175 A | * | 9/1998 | Davis et al. ............ 463/36 |
| 5,824,933 A | | 10/1998 | Gabriel |
| 5,896,125 A | * | 4/1999 | Niedzwiecki ............ 345/168 |
| 5,935,224 A | * | 8/1999 | Svancarek et al. ............ 710/63 |
| 6,098,130 A | * | 8/2000 | Wang ............... 710/100 |
| 6,311,209 B1 | * | 10/2001 | Olson et al. ............ 709/204 |
| 6,371,849 B1 | * | 4/2002 | Togami ............... 463/4 |
| 6,394,897 B1 | | 5/2002 | Togami |
| 6,428,411 B1 | | 8/2002 | Togami |
| 6,468,160 B2 | | 10/2002 | Eliott |

(Continued)

OTHER PUBLICATIONS

"Conflict: Desert Storm" Xbox version user manual, © 2002 Sci, Ltd. Release date of the game established as Sep. 30, 2002.*

(Continued)

*Primary Examiner*—Peter DungBa Vo
*Assistant Examiner*—Matthew D. Hoel

(57) ABSTRACT

A squad-based shooter video game allows players to dynamically join and leave the game, while that game is in progress, without the players having to save and restart the game. When a new player joins an in-progress game, a new squad member is allocated to the new player and the screen is split to present a viewing panel for the new player that depicts scenes from the perspective of the new squad member. When an existing player leaves the game, the screen is unsplit to remove the viewing panel for the exiting player and that player's squad member becomes part of the squad being controlled by the remaining player(s).

32 Claims, 9 Drawing Sheets

U.S. PATENT DOCUMENTS

| | | | |
|---|---|---|---|
| 6,509,896 B1* | 1/2003 | Saikawa et al. | 345/419 |
| 6,511,378 B1* | 1/2003 | Bhatt et al. | 463/36 |
| 6,579,184 B1* | 6/2003 | Tanskanen | 463/41 |
| 6,652,378 B2* | 11/2003 | Cannon et al. | 463/20 |
| 6,712,704 B2 | 3/2004 | Eliott | |
| 6,755,743 B1* | 6/2004 | Yamashita et al. | 463/42 |
| 6,769,989 B2 | 8/2004 | Smith et al. | |
| 6,860,810 B2* | 3/2005 | Cannon et al. | 463/20 |
| 6,932,708 B2* | 8/2005 | Yamashita et al. | 463/42 |
| 6,951,516 B1* | 10/2005 | Eguchi et al. | 436/40 |
| 6,994,626 B1* | 2/2006 | D'Achard Van Enschut | 463/31 |
| 7,116,310 B1* | 10/2006 | Evans et al. | 345/156 |
| 7,137,891 B2* | 11/2006 | Neveu et al. | 463/31 |
| 2001/0006908 A1* | 7/2001 | Fujioka et al. | 463/3 |
| 2002/0065119 A1* | 5/2002 | Togami | 463/4 |
| 2002/0103031 A1 | 8/2002 | Neveu et al. | |
| 2002/0183105 A1* | 12/2002 | Cannon et al. | 463/16 |
| 2003/0045360 A1* | 3/2003 | Hora | 463/42 |
| 2004/0106446 A1* | 6/2004 | Cannon et al. | 463/16 |
| 2004/0162137 A1 | 8/2004 | Eliott | |
| 2004/0166914 A1* | 8/2004 | Ishihata et al. | 463/2 |
| 2005/0233794 A1* | 10/2005 | Cannon et al. | 463/16 |
| 2006/0178179 A1 | 8/2006 | Neveu et al. | |

OTHER PUBLICATIONS

Screenshots of "Conflict: Desert Storm" from cubemedia.ign.com/cube/image, cfictdtorm1.jpg to ~3.jpg, downloaded Mar. 19, 2006.*

IGN review of "Conflict: Desert Storm," cube.ign.com/objects/480/480753.html, downloaded Mar. 19, 2006.*

Take2 Interactive review of "Conflict: Desert Storm," www.take2games.com/index.php?p=games&platform=Xbox&title=cds, downloaded Mar. 19, 2006.*

SCi, Ltd. news releases of "Conflict: Desert Storm," indicating public preview on Nov. 16 and 17, 2001, in Cannes, France, games.sci.co.uk/games/basic.asp?version_id=23, downloaded Mar. 19, 2006.*

Team Xbox preview of "Conflict: Desert Storm" Xbox version, indicating release date of Sep. 30, 2002, before filing date of Dec. 2, 2002, games.teamxbox.com/xbox/34/Conflict-Desert-Storm/, downloaded Mar. 19, 2006.*

"Conflict: Desert Storm," Xbox version user manual, © 2002 Sci, Ltd. Release date of the game established as Sep. 30, 2002.*

Review of "Conflict: Desert Storm," http://games.teamxbox.com/xbox/34/Conflict-Desert-Storm, downloaded Mar. 19, 2006, indicating release date of Sep. 30, 2002, before the filing date.*

Smith, David, "Playstation 2>Previews>Preview, Project Eden", http://ps2.ign.com/articles/134/134929p1.html. 4 pages.

Wessel, Craig "Talon", "Mobile Forces (PC)", May 20, 2002, http://ww.gamespy.com/e32002/pc/mf/, 2 pages.

Wojnarowica, Jakub "WarSpite", "Quake 3 Team Arena Demo," Nov. 24, 2000, http://firingsquad.gamers.com/games.teamarenademo/default.asp, 2 pages.

Eidos, "Something is Wrong in the Garden of Eden!", Feb. 22, 2003, http://www.cdaccess.com/html/pc/projeden.htm, 3 pages.

"Close Quarters Battle", pp. 28.

"D-pad", retrieved on Nov. 16, 2006, at <<http://en.wikipedia.org/wiki/D-pad>>, Wikimedia Foundation, Inc., pp. 1-2.

"Military Organization", retrieved on Nov. 16, 2006, at <<http://en.wikipedia.org/wiki/Military_unit>>, Wikimedia Foundation, Inc., pp. 1-3.

"Operations", retrieved on Nov. 16, 2006, at <<http://www.globalsecurity.org/military/library/policy/army/fm/7-8/change1.htm>>, GlobalSecurity.org, 2000-2006, pp. 1-135.

"SWAT 3: Close Quarters Battle", retrieved on Apr. 27, 2007, at <<http://pc.ign.com/objects/011/011663.htm>>, IGN Entertainment, Inc., pp. 13.

* cited by examiner

DYNAMIC JOIN/EXIT OF PLAYERS DURING PLAY OF CONSOLE-BASED VIDEO GAME

TECHNICAL FIELD

This invention relates to video games for console-based gaming systems, and more particularly, to techniques that allow players to dynamically join or leave a game while it is in progress.

BACKGROUND

One genre of video games is known as "shooter" games, in which players engage in forms of combat using various weapons. Within the shooter genre, the game may be developed in a first person context, in which the player views the scenes through the eyes of the shooter. Alternatively, the game may be architected in a third person context, where the player views the scenes from a camera viewpoint removed from each character.

Some shooter games enable the player to control squads of characters, rather than just a single character. The player can give an order to a selected character of the squad, and that character carries out the orders without direct intervention from the player. Representative squad-based games include Project Eden, which is developed by Core Design Ltd. and published by Eidos Interactive for Sony's Playstation® game system, and X-Squad, which is developed and published by Electronic Arts for Sony's Playstation® game console.

It is common for squad-based, third-person shooter games to support a single player or multiple players. Conventionally, the number of players must be specified in advance of starting the game. This is not conducive, however, to situations where the number of players changes throughout the game. For instance, suppose one player begins a game and one or more additional players want to join midway through the game. Then, at a later point, a different player wants to leave the game before it is over. In such situations, conventional shooter games require that the existing players stop and save the game, return to a setup menu and specify the new number of player(s), and then restart the game. This process is disruptive to the players.

Accordingly, there is a need for improved techniques for adding and removing players while the game is in process, without disrupting game play.

SUMMARY

A video game that allows players to dynamically join and leave the game, while that game is in progress, is described. At anytime after a game is started, the video game detects when a new player joins or an existing player exits the in-progress game. Once detected, the video game dynamically adds or removes the player without requiring other players to save and restart the video game.

In the described implementation, the video game is a third-person squad-based shooter video game for a console-based gaming system. The shooter video game supports play by single or multiple players. In single player mode, the lone player commands a squad of characters, issuing orders for them to carry out during combat. The player is also given direct control over one squad character, while the remaining squad characters are controlled by artificial intelligence to perform in a manner consistent with the commands issued by the player. The single player views the action in full screen from a perspective of their squad character.

After the original player starts play, the shooter video game monitors for a join condition indicating that a new player would like to join the game. The join condition may be triggered, for example, when the new player plugs his/her controller into the game console. In response to the join condition, the video game associates another squad character with the new player. Both players now have control of the same squad. The video game also presents a split screen display with two viewing panels. A first panel allows the first player to view the game scenes from one character's perspective and a second panel allows the new player to view the game scenes from another character's perspective.

Additional players may also join. In the event that there are more players than predefined characters on the squad, the video game generates a generic fighter and adds that fighter to the squad. The last players to join are assigned the generic fighters. As players leave the game, the generic fighters are removed. In this manner, the game dynamically enlarges or reduces the size of the squad to accommodate different numbers of players.

Exiting players can leave the game without disruption to the remaining players. When a player leaves, the video game detects which player is exiting (e.g., sensing which controller is unplugged). The video game returns control of the character associated with the exiting player to the artificial intelligence, or to another player who is currently controlling a generic fighter. The video game then presents an updated screen display that omits the viewing panel used by the exiting player.

BRIEF DESCRIPTION OF THE DRAWINGS

The same numbers are used throughout the disclosure and figures to reference like components and features.

DETAILED DESCRIPTION

The following disclosure describes a squad-based, third person shooter video game that allows players to dynamically join or leave a game in progress without having to save and restart the game. When a new player joins the game (e.g., by plugging a controller into an available slot in the game console), the new player is granted control over a squad member not currently being controlled by another player. The screen display is split to provide multiple viewing panels for the current players. Each viewing panel corresponds to a player and depicts the game action from the perspective of that player's squad member. When the player leaves the game (e.g., by disconnecting the controller), the screen display is updated to remove the viewing panel for the exiting player. The process of joining and leaving is dynamic, allowing continuous and uninterrupted play as players come and go.

For discussion purposes, the third-person shooter video game is described in the context of being played on a console-based gaming system that supports a limited number of game controllers and players. The gaming system will be described first, followed by a discussion of the dynamic join/exit techniques.

Console-Based Gaming System

Figure 1:
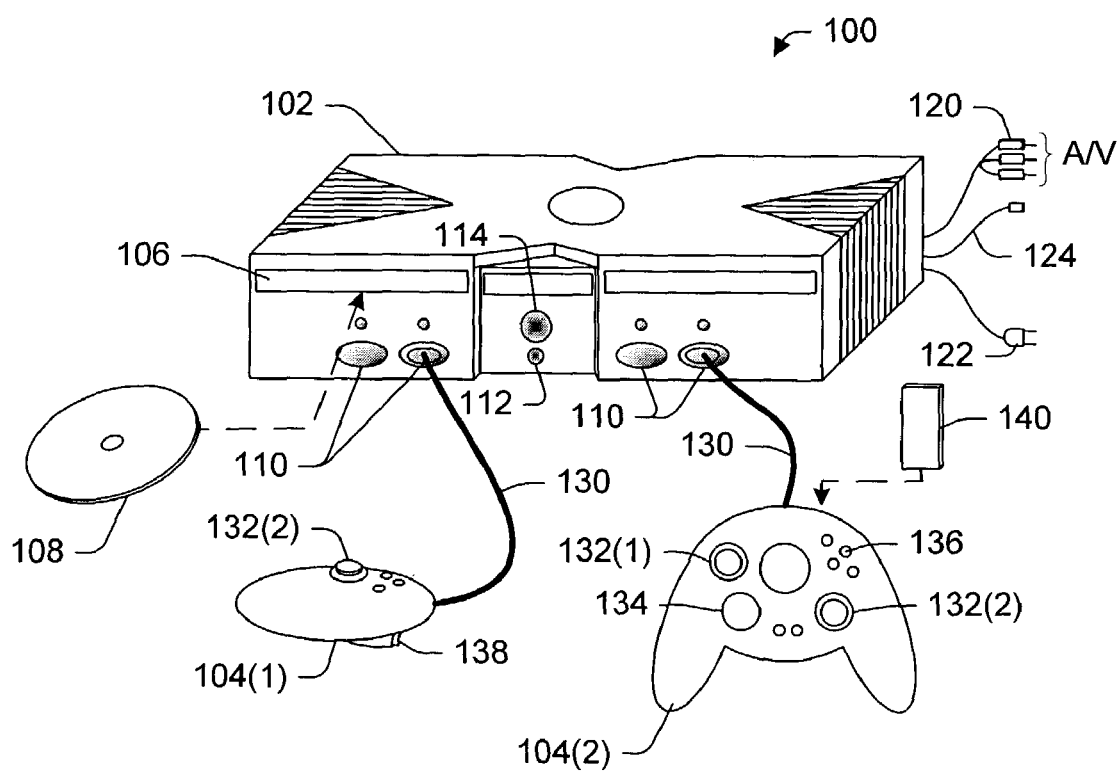
FIG. 1 illustrates a gaming system with a game console and one or more controllers.

FIG. 1 shows an exemplary console-based gaming system 100. It includes a game console 102 and up to four controllers, as represented by two controllers 104(1) and 104(2). The game console 102 is equipped with an internal hard disk drive and a portable media drive 106. The portable media drive 106 supports various forms of portable storage media as represented by optical storage disc 108. Examples of suitable portable storage media include DVD, CD-ROM, game discs, game cartridges, and so forth.

The game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

The game console 102 connects to a television or other display (not shown) via A/V interfacing cables 120. A power cable 122 provides power to the game console. The game console 102 may be further equipped with internal or externally added network capabilities, as represented by the cable or modem connector 124 to facilitate access to a network, such as a local area network (LAN) or the Internet.

Each controller 104 is coupled to the game console 102 via a wire or wireless interface. In the illustrated implementation, the controllers are USB (Universal Serial Bus) compatible and are connected to the console 102 via serial cables 130. The controller 102 may be equipped with any of a wide variety of user interaction mechanisms. As illustrated in FIG. 1, each controller 104 is equipped with two thumbsticks 132(1) and 132(2), a directional or D-pad 134, surface buttons 136, and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and transport them for play on other consoles. In the described implementation, each controller is configured to accommodate two memory units 140, although more or less than two units may be employed in other implementations.

The gaming system 100 is capable of playing, for example, games, music, and videos. With the different storage offerings, titles can be played from the hard disk drive or the portable medium 108 in drive 106, from an online source, or from a memory unit 140. A sample of what the gaming system 100 is capable of playing back includes:

1. Game titles played from CD and DVD discs, from the hard disk drive, or from an online source.

2. Digital music played from a CD in the portable media drive 106, from a compressed file on the hard disk drive (e.g., Windows Media Audio (WMA) format), or from online streaming sources.

3. Digital audio/video played from a DVD disc in the portable media drive 106, from a file on the hard disk drive (e.g., Windows Media Video (WMV) format), or from online streaming sources.

Figure 2:
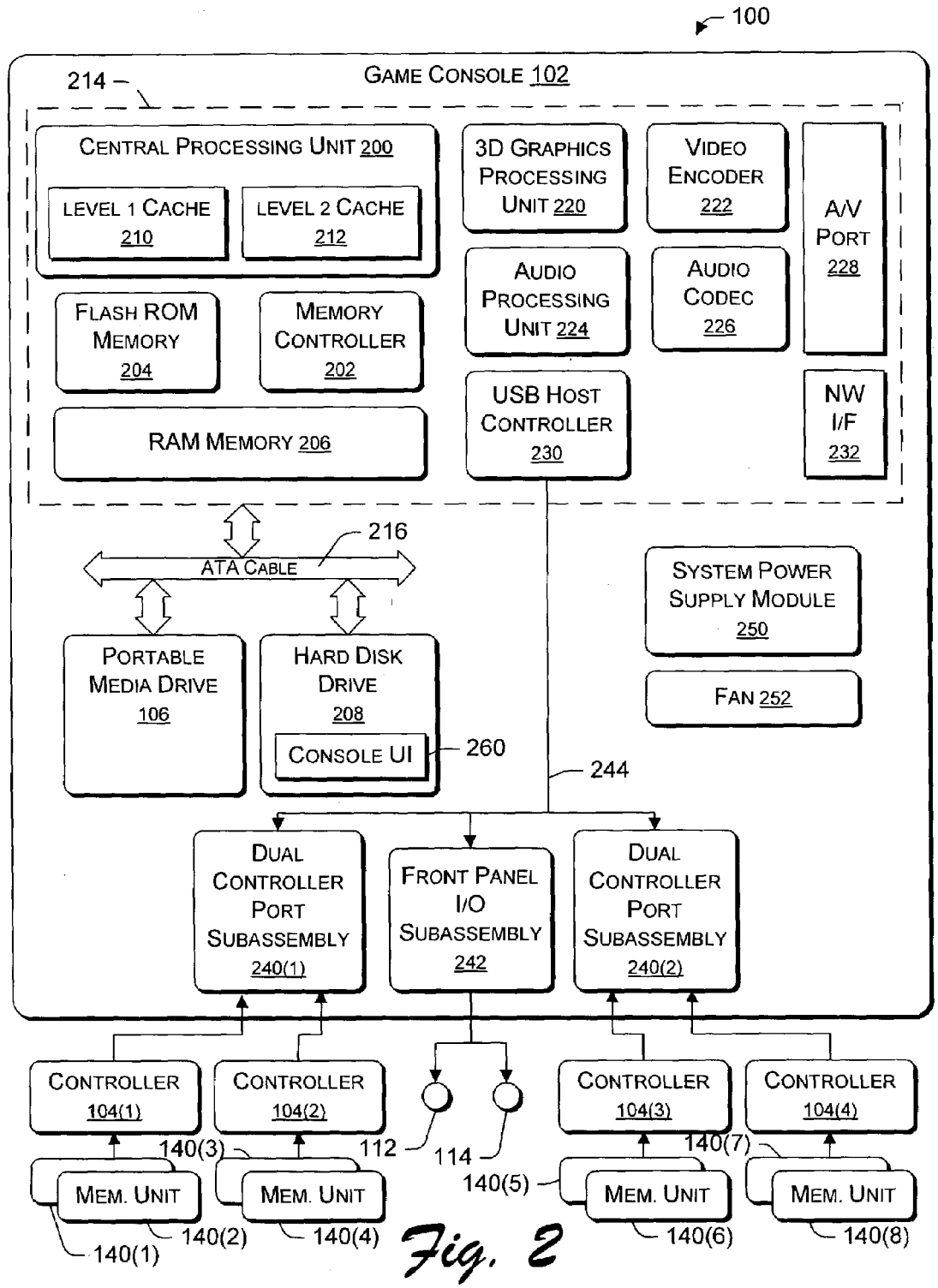
FIG. 2 is a block diagram of the gaming system that is capable of supporting a squad-based shooter video game.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR SDRAM (Double Data Rate Synchronous Dynamic RAM) modules that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., LAN, Internet, etc.) and may be any of a wide variety of various wired or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

A console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The game console 102 implements a cryptography engine to perform common cryptographic functions, such as encryption, decryption, authentication, digital signing, hashing, and the like. The cryptography engine may be implemented as part of the CPU 200, or in software stored in memory (e.g., ROM 204, hard disk drive 208) that executes on the CPU, so that the CPU is configured to perform the cryptographic functions.

The gaming system 100 may be operated as a standalone system by simply connecting the system to a television or other display. In this standalone mode, the gaming system 100 allows one or more players to play games, watch movies, or listen to music. However, with the integration of network connectivity made available through the network interface 232, the gaming system 100 may further be operated as a participant in a larger network gaming community.

Video games, such as the third-person squad-based shooter video game described herein, may be stored on various storage media for play on the game console. For instance, a video game may be stored on the portable storage disc 108, which is read by drive 106. Alternatively, the video game may be stored in hard disk drive 208, being transferred from a portable storage medium or downloaded from a network. During play, portions of the game are temporarily loaded into RAM memory 206, caches 210 and 212, and executed by the CPU 200. One particular video game of the shooter genre is described next.

Single/Multi-Player Modes

The squad-based shooter video game supports play by one or more players. In single player mode, the player is given control over the entire squad of characters. The player can issue commands to each character individually or to groups of characters collectively. The commands instruct the characters on where to move and how to function in combat. The video game further allows one or more additional players to dynamically join a game that is in progress without having to save and restart the game. When additional players join, the players work together, controlling different characters in the squad. The screen is divided to allow each player to view the combat from their character's perspective. Players can also dynamically leave a game without causing a disruption. The single player mode, multi-player mode, and the dynamic transition of adding and removing players are described below.

Single Player Mode

Figure 3:
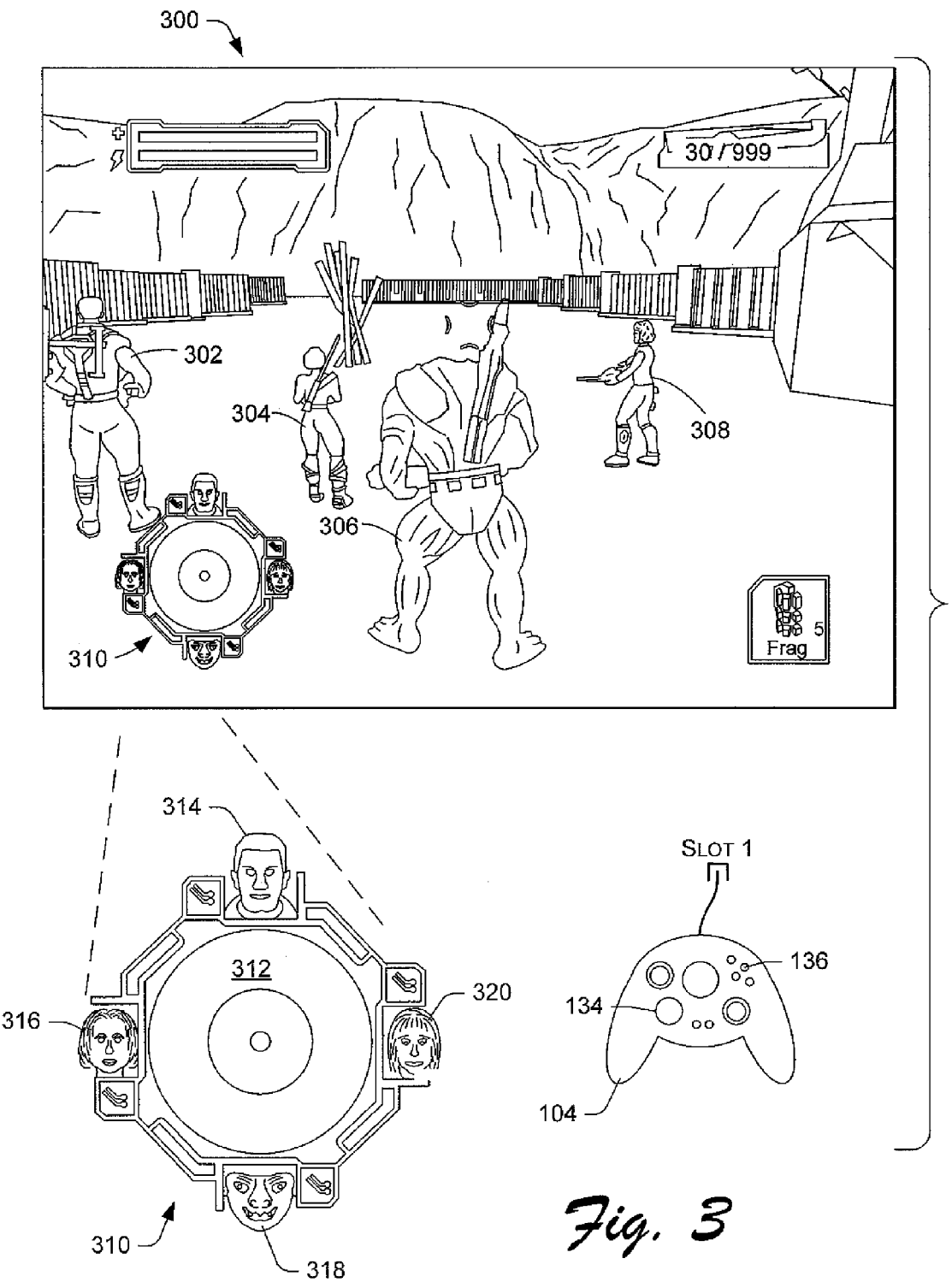
FIG. 3 illustrates an exemplary screen display when a single player is playing the squad-based shooter video game.

FIG. 3 shows an exemplary screen display 300 from the squad-based shooter video game when a single player is playing. The single player is represented by one controller 104 connected to slot 1 in the face of the game console. The illustrated scene is from a video game title, Brute Force, which is developed for Microsoft's Xbox® gaming system. A squad of four characters is illustrated, including a first character 302 named "Tex", a second character 304 named "Hawk", a third character 306 named "Brutus", and a fourth character 308 named "Flint". As is common in third-person games, the player's viewpoint is taken at a position removed from the characters. In this scene, the player viewpoint is manifest from a camera perspective positioned behind and proximal to the Brutus character 306. In the single player mode, the player's viewpoint is depicted in full screen.

A squad status display 310 is positioned in the lower left-hand portion of the scene. In the single player mode, the squad status display 310 is persistently visible during combat action and is located in a non-focal region of the screen, such as the lower left-hand corner as shown. The status display 310 is integrated with a radar display 312, which indicates where various characters of the squad are located relative to one another. In the illustrated example, the squad status display 310 encircles the radar display 312 and depicts profile images of the four squad characters. The profiles include a first character profile 314 for the Tex character 302, a second character profile 316 for the Hawk character 304, a third character profile 318 for the Brutus character 306, and a fourth character profile 320 for the Flint character 308. The four character profiles 314-320 on the squad status display 310 are mapped visually and spatially to a first actuator (e.g., D-pad 134) on the controller 104.

The squad status display 310 indicates which character is currently selected by the player. Here, the Brutus character 306 is selected as represented by a highlighted boundary around the Brutus character profile 318. When the Brutus character is selected, the camera viewpoint resides proximal to, and behind, the Brutus character 306 as shown in screen display 300. The player can select a different character and change the camera viewpoint to that character's perspective by actuating the D-pad 134 at distinct pad coordinates (i.e., north, west, south, east) that correspond to the four character profiles of Tex 314, Hawk 316, Brutus 318, and Flint 320. A double tap of the D-pad 134 allows the player to select a new character and simultaneously change the camera viewpoint in the scene. It is noted that the game may be configured to support selection of the characters using other actuators on the controller. For instance, in one implementation, a player can depress a button or trigger to cycle through the character profiles of the squad status display 310 in clockwise or counter-clockwise rotation.

When a character is selected, the player controls where that character moves, what that character sees, and how that character acts. Artificial intelligence built into the video game controls the other non-selected characters of the squad. The artificial intelligence directs the remaining characters to perform functions consistent with the commands instructed by the player, such as where to move and how to function in combat.

The player can issue commands to one or more characters on the squad. When the player wishes to issue a new command, the player invokes a command change user interface (not shown) that presents various command options. In one implementation, the player single taps the D-pad 134 to concurrently select a character and invoke the command change UI. Once invoked, the command change UI allows the player to select one or more characters and presents possible commands that may be issued to the selected character(s). Example command options include "stand ground", "fire at will", "move to" a specific area, or "cover me". The options are oriented on the screen to map visually and spatially to actuators on the controller 104 (e.g., surface buttons 136) so that one actuation enables a player to issue a common order to the one or more selected characters.

Multi-Player Mode

In addition to single player mode, the squad-based shooter game supports a multi-player mode for multiple players. The players control different members of the squad and work cooperatively to carry out the squad missions. In the standalone setting, the game console 102 of FIG. 1 is equipped with four controller slots to support up to four controllers (and hence, four players). A new player can join one or more existing players in a game that is in progress by simply connecting a controller to an available slot. The video game detects when another player has joined the game by continually polling the hardware for a connection of a controller 104 to an available slot. When a connection is detected, the video game optionally presents a join menu indicating that a new player has joined the game.

Figure 4:
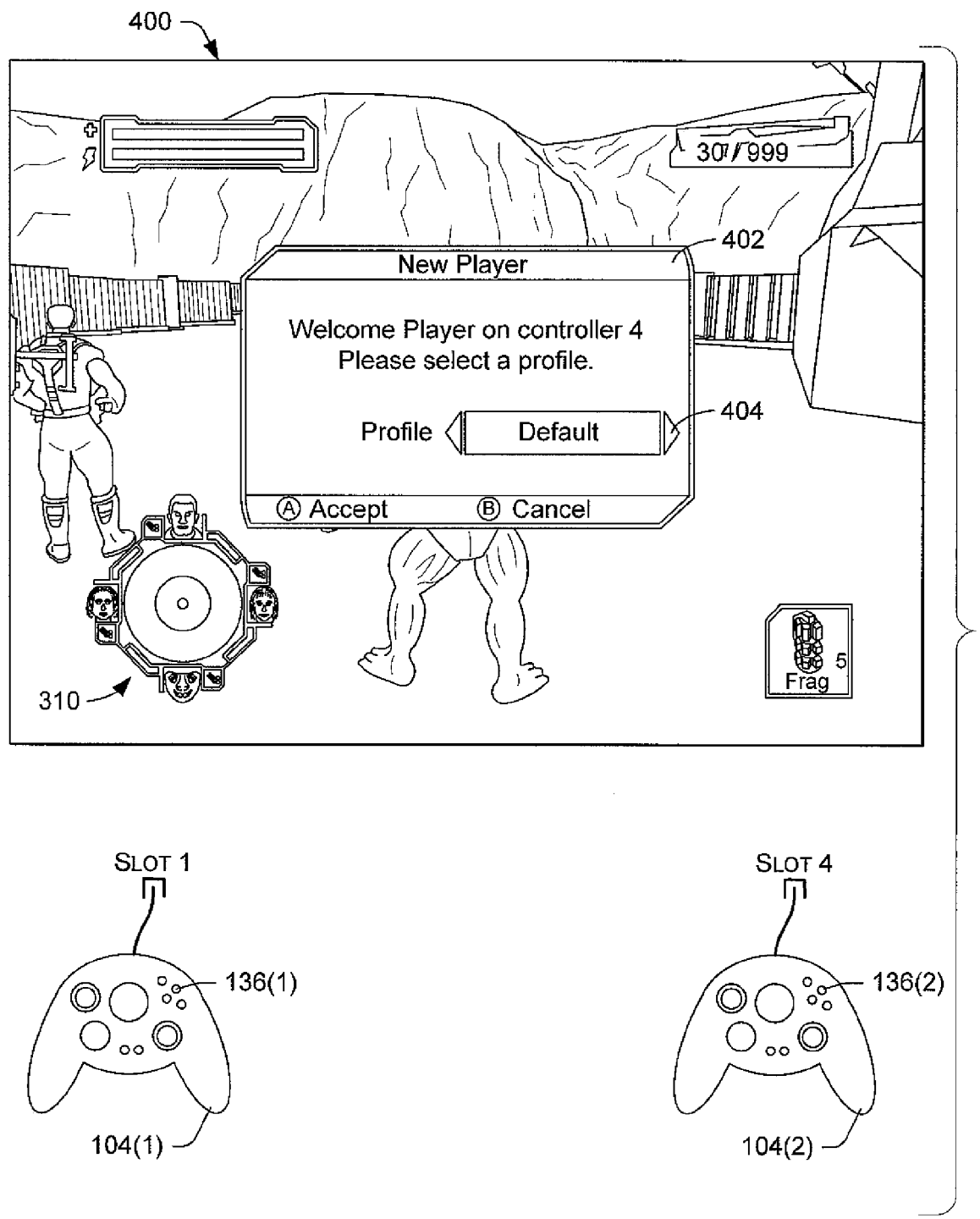
FIG. 4 illustrates an exemplary screen display with a join menu overlaying a scene to indicate that a second player wishes to join the first player in playing the game that is in progress.

FIG. 4 shows a screen display 400 that is depicted when a second player joins the first player by plugging in a controller 104(2) to slot 4 on the face of the game console. A join menu 402 pops up on the screen and overlays the combat action as seen from the character perspective of the first player. The join menu 402 includes a welcoming statement and offers the new player a choice of available player identification profiles via a profile entry box 404. Among the choices is a "Default" choice in which the video game assigns the player an anonymous identity to allow the player to play anonymously. The video game then automatically assigns the new player to an available character. Alternatively, the video game can present a second menu (not shown) to allow the player to select their desired character among those currently available or those that can be made available. Either player can then accept or cancel the join operation via actuation of the controller (e.g., via surface buttons 136(1) or 136(2)) associated with options "A" and "B" on the menu 402.

For purposes of continuing discussion, suppose the new player is automatically assigned to control the Flint character 308. When multiple players participate, the screen is split to accommodate different viewing perspectives for the various players. When the screen is split, the amount of viewing space available for each player is diminished.

Figure 5:
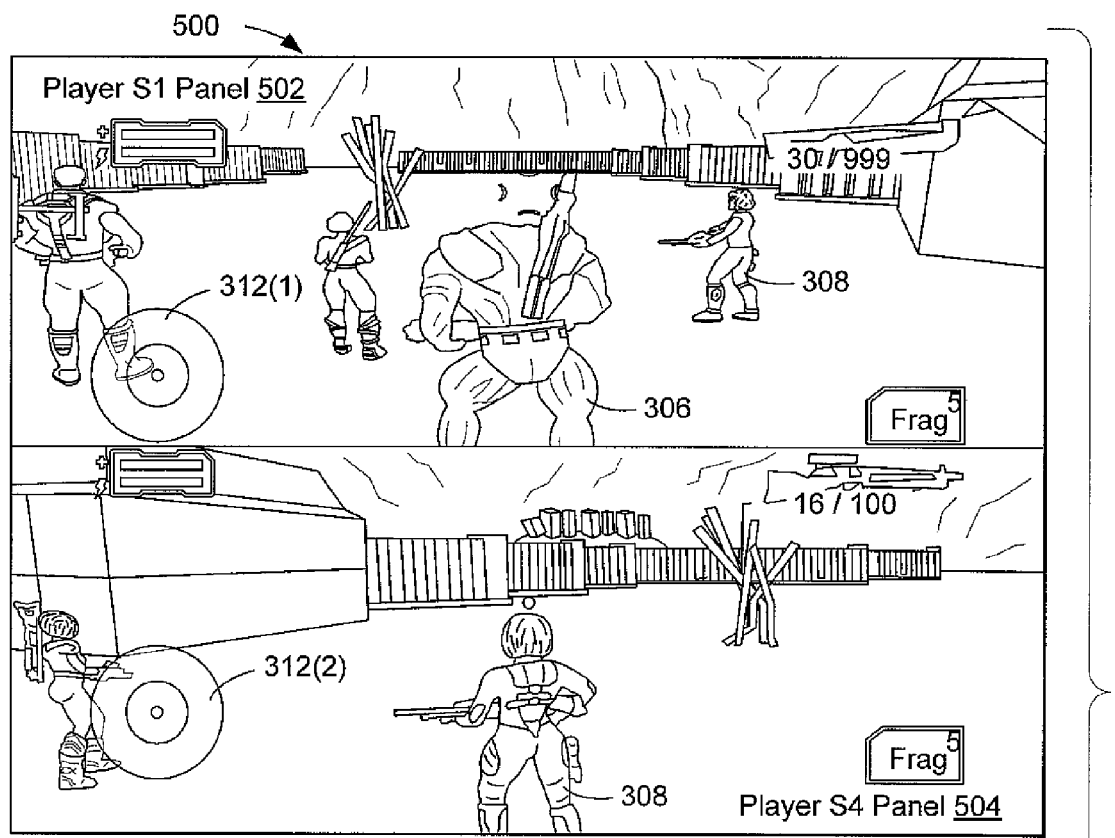
FIG. 5 illustrates an exemplary screen display that splits the screen into two viewing panels, one for each of the two players.
Figure 5:

FIG. 5 shows a screen display 500 that is depicted in response to adding a second player. The screen display is split into two panels: an upper panel 502 and a lower panel 504. The upper panel 502 shows the combat action from the perspective of the character (i.e., the Brutus character 306) selected by the first player who is operating controller 104(1) in slot 1. The lower panel 504 shows the combat action from the perspective of the character (i.e., the Flint character 308) selected by the second player who is operating controller 104(2) in slot 4. The two players control their respective squad members and work together to carry out the mission. The two remaining and unselected characters—Tex and Hawk—are controlled by the artificial intelligence of the video game.

With the reduced screen area for each player, the depicted control elements and visual presentation are chosen to offer a compelling gaming experience for all players. In the illustrated multi-player mode, the squad status display is removed from each panel 502 and 504, leaving the radar displays 312(1) and 312(2). This leaves more screen area for other visual effects.

When there are fewer players than squad members, each player can select another squad character that is not currently being controlled. For instance, the first player who is operating controller 104(1) in slot 1 can switch from the Brutus character 306 to the Hawk or Tex characters. Likewise, the second player who is operating controller 104(2) in slot 4 can switch from the Flint character 308 to the Hawk or Tex characters.

Additional players can continue to join. In the illustrated implementation, the game console 102 has four controller slots 110 (FIG. 1). Assuming two players are already playing, two additional players can join the game. In other implementations, however, the game console can be configured to support more or less than four players. As each player joins a game, the new player is granted control over a squad member and the screen further divides to provide a viewing panel from that squad member's perspective.

Figure 6:
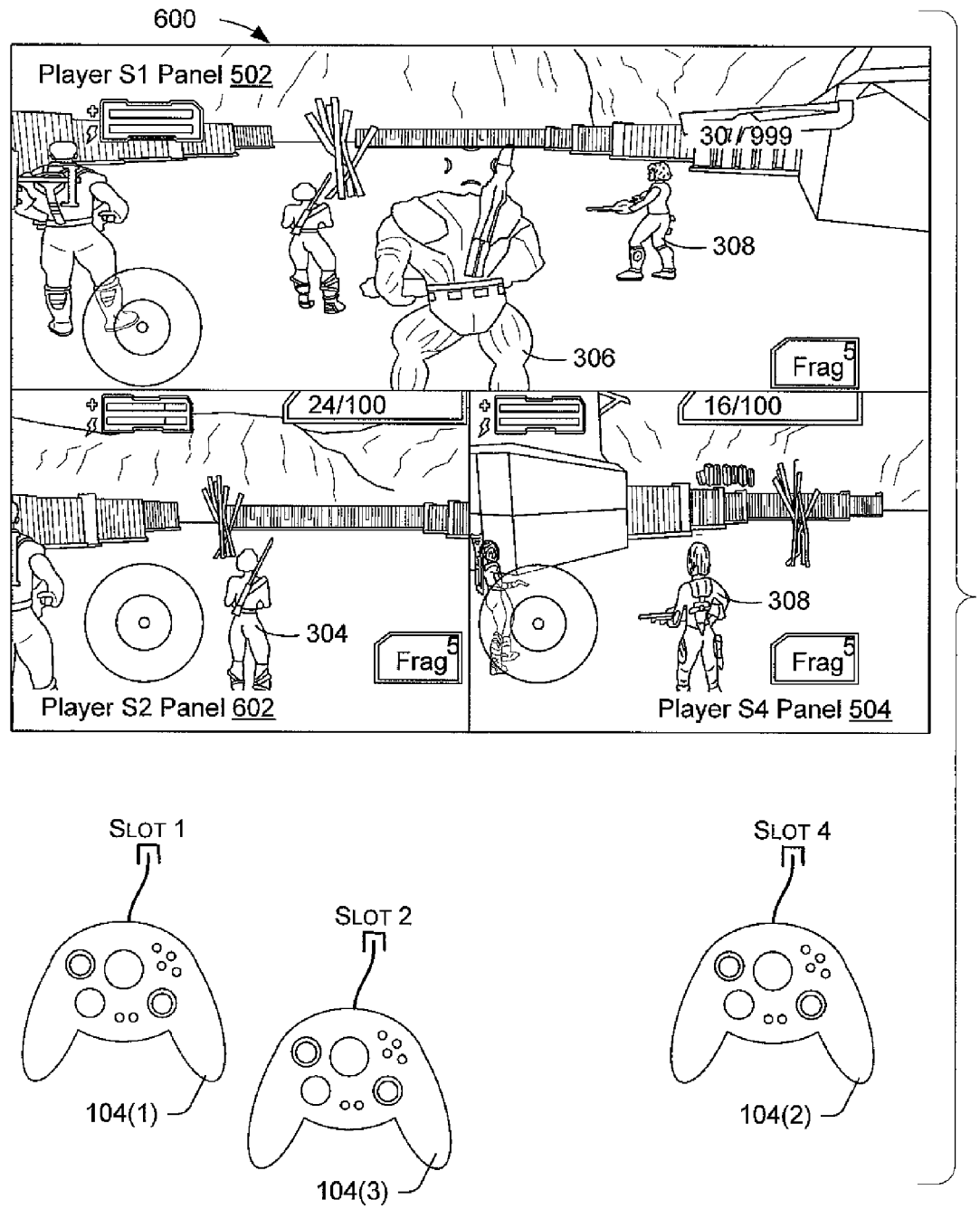
FIG. 6 illustrates an exemplary screen display that separates the screen into three viewing panels, one for each of the three players.

FIG. 6 shows a screen display 600 that is depicted after a third player joins the game by connecting controller 104(3) to slot 2. Upon detecting a new controller, the video game either optionally presents the join menu 402 (not shown in FIG. 6) to enable player selection of a player profile and automatically assigns a character to the new player. The screen is further split to exhibit three viewing perspectives. In FIG. 6, the lower portion of the screen is divided into two quarter panels, a resized panel 504 and a new panel 602. The resized panel 504 continues to show the combat action from the perspective of the Flint character 308 controlled by the second player who is operating controller 104(2) in slot 4. The new panel 602 shows the combat action from the perspective of another character (e.g., the Hawk character 304) associated with the new player who is operating controller 104(3) in slot 2.

Figure 7:
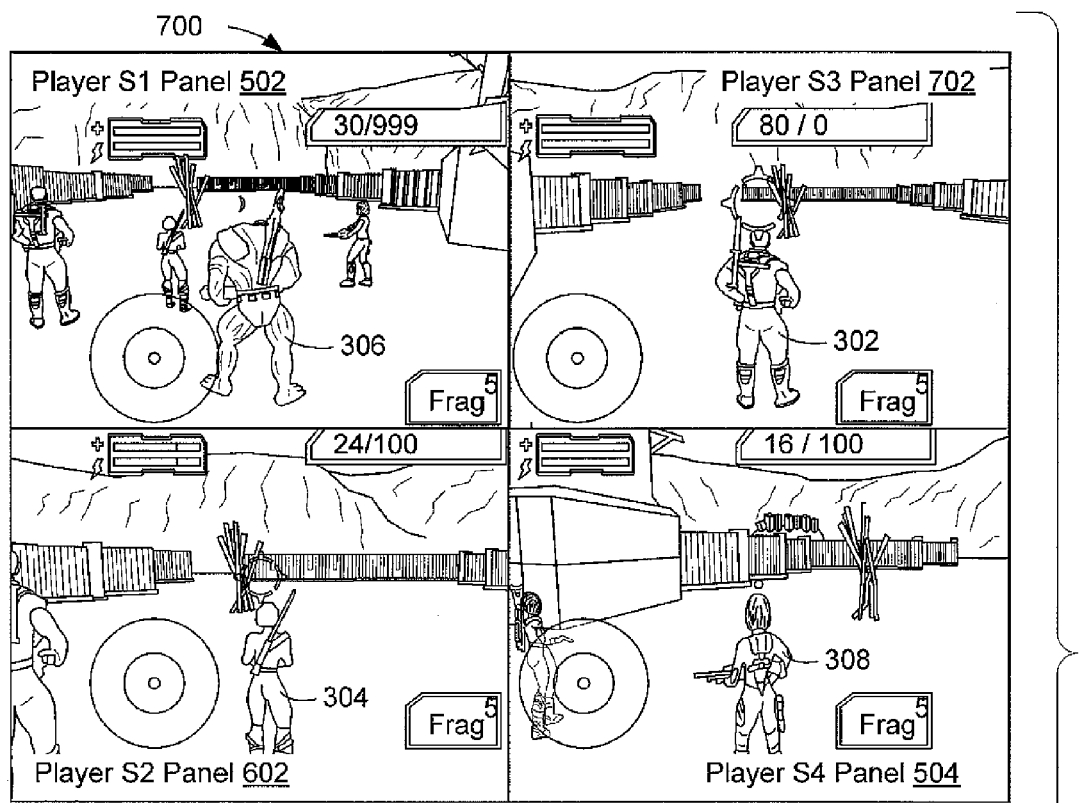
FIG. 7 illustrates an exemplary screen display that separates the screen into four viewing panels, one panel for each of the four players.
Figure 7:
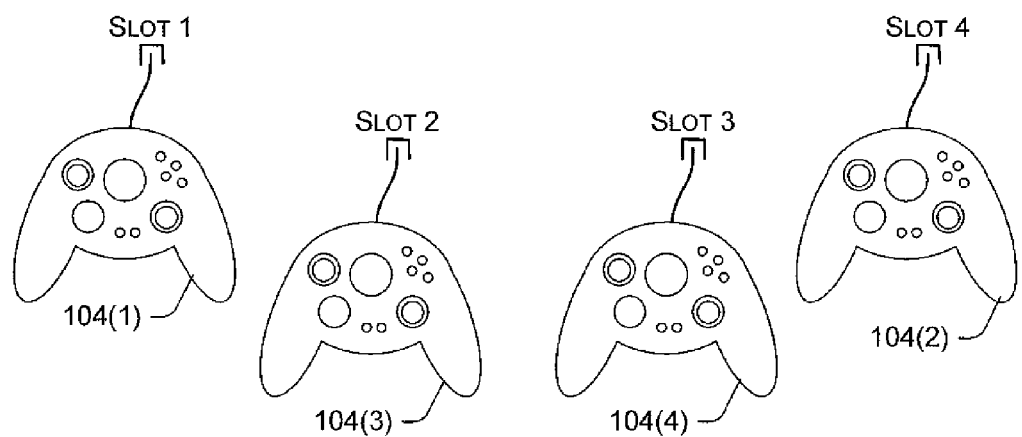

FIG. 7 shows a screen display 700 that appears after a fourth player joins the game. Once controller 104(4) is detected at slot 3, the video game optionally presents the join menu 402 (not shown in FIG. 7) to enable player selection of a player profile. The game then automatically assigns an available character to the new player. The screen is once again split to exhibit four perspectives, one each for the four players. In this example, the upper portion of the screen is divided into two quarter panels, a resized panel 502 and a new panel 702. The resized panel 502 continues to show the combat action from the perspective of the Flint character 308 controlled by the first player who is operating controller 104(1) in slot 1. The new panel 702 shows the combat action from the perspective of the Tex character 302 controlled by the new player who is operating controller 104(4) in slot 3.

It is noted that the relationship of which screen panels are controlled by which controllers is merely representative. In one implementation, the game can be configured to associate particular screen panels with specific controller slots, but this need not be the case. Additionally, there is no particular order of slots for players to plug into as they join a game. For example, a single player could play the game alone using a controller inserted into any one of the four slots on the game console. A second player could later join by inserting his/her controller into any one of the remaining unused slots, and so on.

As noted earlier, depiction of the join menu 402 (FIG. 4) as each new player joins the game is optional. In another implementation, the video game can proceed directly to the split screen display 500, 600, or 700 without presenting the join menu 402. In this case, the video game automatically assigns a player profile identity to the new player and presents that view from an assigned character in the newly created screen panel. This allows the game to continue without any interruption that may be caused by the pop up menu 402. In yet another implementation, the video game can present join menu 402 and then present another menu to allow the player to select their desired character among those currently available or those that can be made available. In any event, regardless of whether a join menu is presented or the assignment of player identity profiles or new characters is automatic, the techniques described above allow new players to join an in-progress game without first having to save the game, return to a setup menu and re-specify the number of players, and then restart the game.

In the above example, there are four characters in a squad. When all four players are present, each player controls a squad character. In other implementations, there may be more or less than four squad characters. In the case where there are more players than available characters, the video game generates and assigns a generic fighter to the squad. This generic squad member does not have the personalities associated with the predefined characters—Tex, Hawk, Flint, and Brutus—but can be controlled by a player to function in the field of combat. As an example, suppose the video game console is configured to support six players and the video game has four predefined characters on the squad. When a fifth or sixth player joins the game after all four main characters are assigned, the video game automatically generates or "spawns" a generic fighter for the new player. The generic fighter is added to the squad and works together with the other squad members to accomplish various missions.

If a different player subsequently leaves, thereby relinquishing control of one of the main characters, the video game replaces the generic fighter with the vacated character. Through the use of generic fighters, the size of the squad is expanded or contracted to satisfy the number of players.

Dynamic Joining Process

Figure 8:
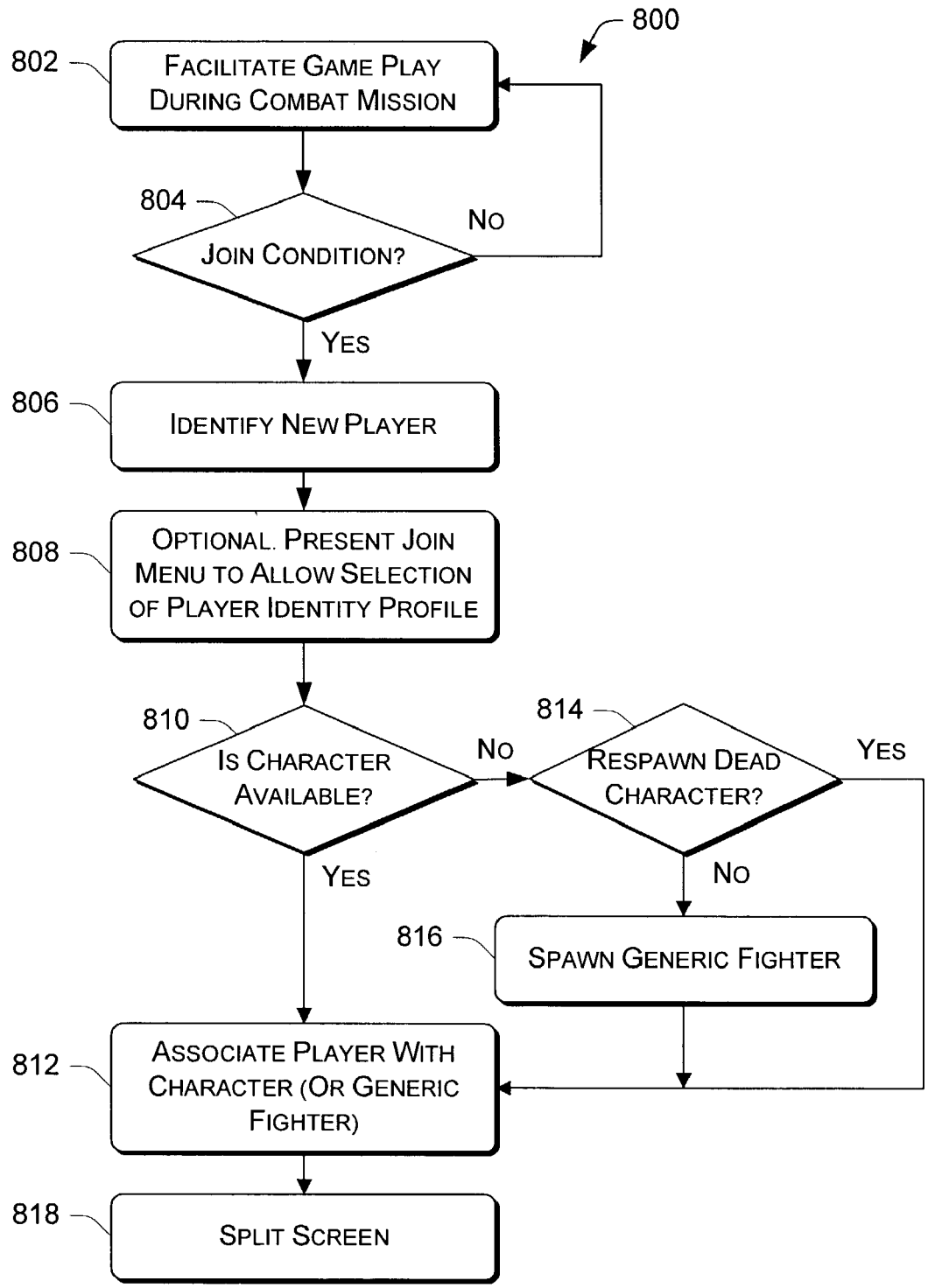
FIG. 8 is a flow diagram of an exemplary process for enabling additional players to dynamically join a game that is in progress.

FIG. 8 shows a process 800 for dynamically joining a new player to a current game that is in progress. The process 800 is illustrated as a series of blocks representing individual operations or acts performed by the gaming system in response to executing the video game. The process 800 may be implemented in any suitable hardware, software, firmware, or combination thereof. In the case of software and firmware, process 800 represents a set of operations implemented as computer-executable instructions stored in memory and executable by one or more processors.

At block 802, the video game facilitates game play during an ongoing combat mission. The game is already in progress, and the existing one or more players are controlling various characters of the squad as they embark on their combat mission. At block 804, the video game detects when another player has joined the game while the game is in progress. In one implementation, a join condition is generated when a hardware interrupt condition occurs indicating that a new controller has been inserted into a vacant slot. The video game continually polls for such hardware interrupts. In one implementation, the video game polls once every video frame.

When a join condition occurs (i.e., the "yes" branch from block 804), the video game identifies the new player associated with the newly attached controller (block 806). The player identity (e.g., player in slot N) is stored in memory. At block 808, the video game optionally presents the join menu to enable the player to select a player identity profile. A representative join menu 402 is illustrated in FIG. 4, where a second player is about to join a one existing player.

At block 810, the video game determines whether a living character (or one that is optionally selected) is available. If a character is available (i.e., the "yes" branch from block 810), the video game associates the character with the player identity profile (block 812). This can be done by correlating a character identity with the player identity profile in memory.

If no character is available (i.e., the "no" branch from block 810), the video game decides whether current game settings allow primary characters that have died in battle to be re-spawned (block 814). That is, one game setting allows characters who have been defeated in a mission to be given new life, or "re-spawned", with new health even though the mission is not over. If such a setting (i.e., the "yes" branch from block 810), the video game regenerates that character and assigns him to the new player (block 812). Otherwise, if all characters are taken and/or dead characters cannot be re-spawned (i.e., the "no" branch from block 810), the video game generates a generic fighter (block 816) and assigns that generic fighter to the new player (block 812).

At block 818, the video game splits the screen to provide a viewing panel for the new player. The new viewing panel offers the perspective of the combat from the new player's character. This is illustrated in the figures as the number of players increases from one player (FIG. 3) to two players (FIG. 5) to three players (FIG. 6) to four players (FIG. 7). After the screen is split, the combat campaign continues with a new set of players handling various ones of the squad members.

Dynamic Leaving Process

The squad-based shooter video game further supports game continuity when one or more players leave a game that is in progress. Players can dynamically leave a game without having to halt and save the game, and then restart it following their departure.

Figure 9:
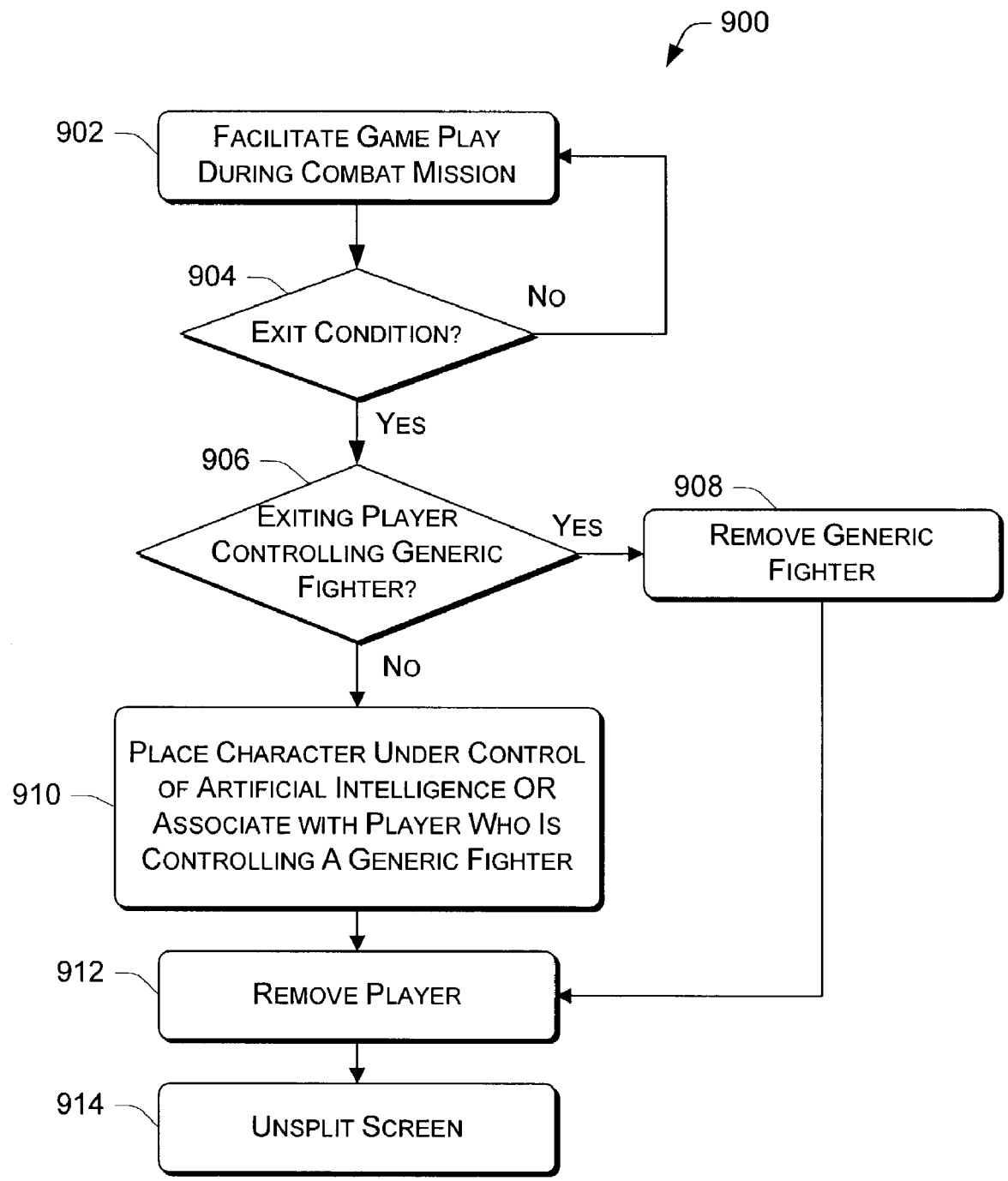
FIG. 9 is a flow diagram of an exemplary process for enabling existing players to dynamically leave the game while it is in progress.

FIG. 9 shows a process 900 for allowing one or multiple players to dynamically leave the game while it is in progress. The process 900 may be implemented in any suitable hardware, software, firmware, or combination thereof. In the case of software and firmware, process 900 represents a set of operations implemented as computer-executable instructions stored in memory and executable by one or more processors.

At block 902, a combat mission is in progress, with multiple players controlling various squad members. At block 904, the video game continually monitors for an exit condition. This condition may be triggered, for example, when a player disconnects his/her controller from the video console. Detachment of the controller causes a hardware interrupt condition, which is detected by the video game and interpreted as a player leaving the game. Upon detecting an exit condition (i.e., the "yes" condition from block 904), the video game determines whether the exiting player is controlling a generic fighter (block 906). If so (i.e., the "yes" branch from block 908), the video game removes the generic fighter from combat (block 908).

On the other hand, if the exiting player is controlling a character (i.e., the "no" branch from block 906), the video game can either place the character back under the control of the artificial intelligence or substitute the character for a generic fighter currently be controlled by another player (block 910). This latter option allows the player to control a predefined character, with a unique personality and special abilities, rather than a generic fighter. The substitution is performed by re-associating the character relinquished by the exiting player with the identity of the existing player who is controlling the generic fighter.

At block 912, the exiting player is removed and that player's identity is deleted from memory. The video game then updates the screen to remove the panel for the exiting player (block 914).

Joining the Enemy

In the above discussion, new players are given control of other squad members and work cooperatively with other players to fight a common enemy. In another implementation, a new player could be allowed to take over the enemy fighters. When the new player joins (e.g., by attaching a game controller to an available slot), the join menu 402 offers an option to control an enemy squad. Assuming the player chooses this option, the new player is associated with a fighter on the enemy and the new viewing panel for that player depicts the battle perspective taken from the enemy fighter. This can be extended further for three or more players, where multiple players can work together in controlling the squad of characters in competition with multiple other players who are cooperatively controlling the squad of enemy fighters.

CONCLUSION

The above-described squad-based, third person shooter video game allows players to dynamically join or leave a game in progress without having to save and restart the game. This allows continuous and uninterrupted play as players come and go. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method implemented at least in part by a computing device comprising:
    facilitating play of a game played on the computing device, the computing device comprising a physical game console, by at least one existing player;
    detecting, by a processor of the physical game console, while the existing player is playing the game, a join condition indicating that a new player would like to join in playing the game, wherein the join condition is generated as a result of the new player connecting a game controller to the physical game console;
    upon the processor detecting the join condition, the processor automatically splitting an image displayed on a physical display to present multiple viewing panels such that the existing player views action through a first viewing panel and the new player views action through a second viewing panel; and
    the processor facilitating play of the game by the existing player and the new player.

2. A method as recited in claim 1, wherein prior to splitting the image displayed on the physical display, further comprising the processor presenting on the physical display a join menu to indicate a new player is joining the game.

3. A method as recited in claim 1, wherein the game is a squad-based shooter game, further comprising the processor associating a first member from a squad with the existing player and associating a second member of the squad with the new player such that the existing and new players control different members of the squad.

4. A method as recited in claim 1, wherein the game is a squad-based shooter game in which a first squad of fighters enters combat against a second squad of fighters, further comprising the processor assigning control of the first squad to the existing player and assigning control of the second squad to the new player.

5. A method as recited in claim 1, further comprising:
    the processor detecting, while the existing and new players are playing the game, an exit condition indicating that one of the players is quitting play of the game; and
    upon the processor detecting the exit condition, the processor automatically unsplitting the image displayed on the physical display to remove one of the first and second viewing panels associated with the player who quits play of the game.

6. One or more computer-readable media comprising computer-executable instructions that, when executed by a computer comprising a physical game console, perform a method comprising:
    facilitating play of a game played on the physical game console by at least one existing player;
    detecting, by a processor of the physical game console, while the existing player is playing the game, a join condition indicating that a new player would like to join in playing the game, wherein the join condition is generated as a result of the new player connecting a game controller to the physical game console;
    upon the processor detecting the join condition, the processor automatically splitting an image displayed on a physical display to present multiple viewing panels such that the existing player views action through a first viewing panel and the new player views action through a second viewing panel; and
    the processor facilitating play of the game by the existing player and the new player.

7. A method comprising:
    a processor of a physical game console facilitating play of a squad-based video game played on the physical game console where at least one existing player controls a first character from a squad of characters;
    upon addition of a new player, the addition of the new player comprising connecting a game controller to the physical game console, the processor ascertaining a second character from the squad of characters that is not currently being controlled by another player and associating the second character with the new player so that the new player controls the second character while the existing player controls the first character; and
    the processor automatically splitting an image displayed on a physical display to present multiple viewing panels including a first viewing panel for the existing player and a second viewing panel for the new player.

8. A method as recited in claim 7, wherein the associating comprises the processor automatically assigning the second character to the new player.

9. A method as recited in claim 7, further comprising the processor detecting, while the existing player is playing the video game, a join condition indicating that the new player would like to join in playing the video game and the processor automatically allowing the new player to join in playing the video game while in progress without having to save and restart the video game.

10. A method as recited in claim 7, further comprising the processor enabling the existing player to switch from controlling the first character to controlling a third character from the squad of characters.

11. A method as recited in claim 7, further comprising the processor enabling the new player to switch from controlling the second character to controlling a third character from the squad of characters.

12. A method as recited in claim 7, further comprising the processor presenting a join menu on the physical display to indicate that the new player would like to join in playing the video game.

13. A method as recited in claim 7, further comprising the processor presenting a join menu on the physical display that enables the new player to select a pre-defined player identity profile.

14. A method as recited in claim 7, wherein remaining characters on the squad, which are not being controlled by the existing and new players, are controlled by the processor using artificial intelligence, the method further comprising:
the processor detecting, while the existing and new players are playing the squad-based video game, an exit condition indicating that one of the players is quitting play; and
upon the processor detecting the exit condition, the processor returning control of the character associated with the quitting player to the artificial intelligence.

15. One or more computer-readable media comprising computer-executable instructions that, when executed by a computer comprising a physical game console, perform a method comprising:
facilitating play of a squad-based video game played on the physical game console where at least one existing player controls a first character from a squad of characters;
detecting, by a processor of the physical game console, while the existing player is playing the game, a join condition indicating that a new player would like to join in playing the game, wherein the join condition is generated as a result of the new player connecting a game controller to the physical game console, and upon the processor detecting the join condition:
the processor ascertaining a second character from the squad of characters that is not currently being controlled by another player and the processor associating the second character with the new player so that the new player controls the second character while the existing player controls the first character; and
the processor automatically splitting an image displayed on a physical display to present multiple viewing panels including a first viewing panel for the existing player and a second viewing panel for the new player.

16. A method comprising:
facilitating play of a third-person, squad-based shooter video game played on a physical game console by a first player, a first player controlling a squad of characters and viewing scenes from a perspective of a first character in the squad;
a processor of the physical game console detecting, while the first player is playing the squad-based shooter video game, a join condition indicating a second player would like to join in playing the squad-based shooter video game, wherein the join condition is generated by a controller being connected to the physical game console;
in response to the processor detecting the join condition and without causing the squad-based shooter video game to be saved and restarted, the processor ascertaining a second character from the squad of characters that is not currently being controlled by another player and the processor associating the second character with the second player so that the second player controls the second character while the first player controls the first character; and
the processor splitting an image displayed on a physical display to present multiple viewing panels such that the first player views the squad-based shooter video game through a first viewing panel from the perspective of the first character and the second player views the squad-based shooter video game through a second viewing panel from a perspective of the second character.

17. A method as recited in claim 16, wherein the associating comprises the processor automatically assigning the second character to the second player.

18. A method as recited in claim 16, further comprising the processor enabling the first and second players to switch, independent of one another, from controlling the first and second characters, respectively, to controlling remaining characters in the squad.

19. A method as recited in claim 16, further comprising the processor presenting on the physical display a join menu to indicate that the second player would like to join in playing the squad-based shooter video game.

20. A method as recited in claim 16, wherein remaining characters on the squad, which are not being controlled by the first and second players, are controlled by the processor using artificial intelligence, the method further comprising:
the processor detecting, while the first and second players are playing the squad-based shooter video game, an exit condition indicating that one of the players is quitting play;
upon the processor detecting the exit condition, the processor returning control of the character associated with the quitting player to the artificial intelligence; and
the processor unsplitting the image displayed on the physical display to remove one of the first and second viewing panels associated with the player who is quitting play.

21. One or more computer-readable media comprising computer-executable instructions that, when executed by a computer comprising a physical game console, perform a method comprising:
facilitating by a processor of the physical game console play of a third-person, squad-based shooter video game played on the physical game console by a first player, the first player controlling a squad of characters and viewing scenes from a perspective of a first character in the squad;
the processor detecting, while the first player is playing the squad-based shooter video game, a join condition indicating a second player would like to join in playing the squad-based shooter video game, wherein the join condition is generated by a controller being connected to the physical game console;
in response to the processor detecting the join condition and without causing the squad-based shooter video game to be saved and restarted, the processor ascertaining a second character from the squad of characters that is not currently being controlled by another player and associating the second character with the second player so that the second player controls the second character while the first player controls the first character; and
the processor splitting an image displayed on a physical display to present multiple viewing panels such that the first player views the squad-based shooter video game through a first viewing panel from the perspective of the first character and the second player views the squad-based shooter video game through a second viewing panel from a perspective of the second character.

22. For use with a physical console-based video game system, a storage medium storing a squad-based shooter video game in which a first player controls a squad of characters, the squad-based shooter video game having instructions that, when executed by a processor of the video game system, performs acts comprising:

the processor monitoring for a condition indicating that a second player wishes to join the first player in playing the squad-based shooter video game while in progress;

upon the processor detecting a join condition, the processor presenting on a physical display a join menu and the processor automatically splitting an image displayed on a physical display to present multiple viewing panels such that the first player views action through a first viewing panel and the second player views action through a second viewing panel, wherein the join condition is generated by a controller being connected to the physical game console; and the processor dynamically joining the second player to the squad-based shooter video game while in progress without having to save and restart the squad-based shooter video game.

23. A storage medium as recited in claim 22, wherein the squad-based shooter video game has further instructions that, when executed by the processor of the video game system, the processor performs acts comprising presenting a join menu on the physical display indicating that the new player wishes to join in playing the video game.

24. A storage medium as recited in claim 22, wherein the squad-based shooter video game has further instructions that, when executed by the processor of the video game system, the processor performs acts comprising the processor detecting when the second player quits playing the squad-based shooter video game and the processor dynamically removing the second player from the squad-based shooter video game while in progress without having to save and restart the video game.

25. A storage medium as recited in claim 24, wherein the squad-based shooter video game has further instructions that, when executed by the processor of the video game system, the processor performs acts comprising:

when the second player joins, the processor splitting an image displayed on the physical display to provide first and second viewing panels, the first viewing panel being for the first player and the second viewing panel being for the second player; and when the second player quits, the processor unsplitting the image displayed on the physical display to remove the second viewing panel.

26. For use with a physical console-based video game system, a storage medium storing a squad-based shooter video game in which individual players control a squad of characters, the squad-based shooter video game having instructions that, when executed by a processor of the video game system, the processor performs acts comprising:

the processor associating a first character from the squad with a first player;

the processor enabling the first player to switch control from the first character to other characters in the squad;

the processor detecting, while the first player is playing the squad-based shooter video game, a join condition indicating a second player would like to join in playing the squad-based shooter video game, wherein the join condition is generated by a controller being connected to the physical game console;

the processor ascertaining a second character from the squad that is not currently being controlled by another player and the processor associating the second character from the squad with the second player;

the processor splitting an image displayed on a physical display by presenting multiple viewing panels such that the first player views the squad-based shooter video game through a first viewing panel from a perspective of the first character and the second player views the squad-based shooter video game through a second viewing panel from a perspective of the second character; and the processor enabling the first and second players to switch control from the first and second characters, respectively, to other characters in the squad.

27. A storage medium as recited in claim 26, wherein the squad-based shooter video game has further instructions that, when executed by the processor of the video game system, the processor performs acts comprising:

the processor detecting addition of a third player while the first and second players are playing the squad-based shooter video game;

the processor associating a third character from the squad with the third player; and the processor splitting an image displayed on the physical display by presenting three viewing panels such that the first player views the squad-based shooter video game through a first viewing panel from a perspective of the first character, the second player views the squad-based shooter video game through a second viewing panel from a perspective of the second character, and the third player views the squad-based shooter video game through a third viewing panel from a perspective of the third character.

28. A storage medium as recited in claim 27, wherein the squad-based shooter video game has further instructions that, when executed by the processor of the video game system, the processor performs acts comprising:

the processor detecting addition of a fourth player while the first, second, and third players are playing the squad-based shooter video game;

the processor associating a fourth character from the squad with the fourth player; and the processor splitting an image displayed on the physical display by presenting four viewing panels such that the first player views the squad-based shooter video game through a first viewing panel from a perspective of the first character, the second player views the squad-based shooter video game through a second viewing panel from a perspective of the second character, the third player views the squad-based shooter video game through a third viewing panel from a perspective of the third character, and the fourth player views the squad-based shooter video game through a fourth viewing panel from a perspective of the fourth character.

29. For use with a physical console-based video game system, a storage medium storing a squad-based video game in which individual players control a squad of N characters, the squad-based video game having instructions that, when executed by a processor of the video game system, the processor performs acts comprising:

the processor detecting addition of an Nth+1 player after N players have begun playing the squad-based video game by detecting that a controller has been connected to the video game system;

the processor associating the Nth+1 player with a generic squad member independent of the N characters in the squad; and the processor splitting an image displayed on a physical display by presenting N+1 viewing panels such that each player views the squad-based video game through a corresponding viewing panel from perspectives of the N characters and the generic squad member.

30. A storage medium as recited in claim 29, wherein the squad-based video game has further instructions that, when executed the processor of the video game system, the processor performs acts comprising the processor detecting when one of the players quits playing the squad-based video game and the processor presenting an image displayed on the physical display having N viewing panels, omitting an Nth+1 viewing panel associated with said one player who quits.

31. A storage medium as recited in claim 30, wherein the squad-based video game has further instructions that, when executed by the processor of the video game system, the processor performs acts comprising the processor reassociating the Nth+1 player with a character previously associated with said one player who quits and removing the generic squad member.

32. A storage medium as recited in claim 30, wherein the squad-based video game has further instructions that, when executed the video game system, the processor performs acts comprising the processor detecting when another one of the players quits playing the squad-based video game and the processor returning control of the character associated with said another player who quits to artificial intelligence implemented in the squad-based video game.

* * * * *